(12) United States Patent
Calvarese

(10) Patent No.: US 10,025,961 B2
(45) Date of Patent: Jul. 17, 2018

(54) ARRANGEMENT FOR, AND METHOD OF, ENHANCING ACCURACY OF DATA COLLECTION FOR ITEMS LOCATED IN A VENUE

(71) Applicant: SYMBOL TECHNOLOGIES, LLC, Lincolnshire, IL (US)

(72) Inventor: Russell E. Calvarese, Stony Brook, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 14/809,340

(22) Filed: Jul. 27, 2015

(65) Prior Publication Data

US 2017/0032162 A1 Feb. 2, 2017

(51) Int. Cl.
| | | |
|---|---|---|
| G08B 5/22 | (2006.01) | |
| G06K 7/10 | (2006.01) | |
| H04W 4/02 | (2018.01) | |
| G06K 7/00 | (2006.01) | |

(52) U.S. Cl.
CPC ....... *G06K 7/10386* (2013.01); *G06K 7/0004* (2013.01); *H04W 4/023* (2013.01)

(58) Field of Classification Search
CPC .......... G01S 13/878; G06K 2017/0045; G06K 2017/0051; G06Q 10/087; G06Q 20/203; G07C 9/00111; G08B 13/2462
USPC ......... 340/5.92, 572.1, 8.1; 455/404.2, 456.1
See application file for complete search history.

(56) References Cited

U.S. PATENT DOCUMENTS

| | | | |
|---|---|---|---|
| 8,884,744 B2 | 11/2014 | Bellows et al. | |
| 2006/0290472 A1* | 12/2006 | Onderko | G06K 7/0008 340/10.1 |
| 2008/0237339 A1* | 10/2008 | Stawar | B62B 3/1408 235/383 |
| 2009/0309704 A1* | 12/2009 | Chang | H04Q 9/00 340/10.1 |
| 2010/0130229 A1* | 5/2010 | Sridhara | G01S 19/49 455/456.1 |
| 2011/0018769 A1* | 1/2011 | Misikangas | G01S 5/0072 342/451 |
| 2011/0084832 A1* | 4/2011 | Midtun | G06Q 10/06 340/539.13 |
| 2013/0154802 A1* | 6/2013 | O'Haire | G01S 13/751 340/10.1 |
| 2014/0118113 A1 | 5/2014 | Kaushik et al. | |
| 2014/0210598 A1* | 7/2014 | Mitchell | G06K 7/0008 340/10.5 |
| 2014/0336920 A1* | 11/2014 | Burrell | G01C 21/206 701/409 |
| 2014/0350715 A1* | 11/2014 | Gopalakrishnan | G06Q 10/087 700/215 |

(Continued)

*Primary Examiner* — Carlos E Garcia

(57) ABSTRACT

Accuracy of data collection for items located in a venue is enhanced by moving a mobile data capture device in the venue toward the items, by capturing information data from each item in a reading state of operation of the mobile device, by determining device position data of the mobile device in the venue at a variable level of locationing system performance, by determining item position data of each item in the venue based on the determined device position data of the mobile device, and by modifying the reading state of operation of the mobile device when the variable level is below a reference threshold level of locationing system performance.

18 Claims, 3 Drawing Sheets

(56) References Cited

U.S. PATENT DOCUMENTS

2015/0038167 A1 2/2015 Alles et al.
2015/0043389 A1 2/2015 Calvarese
2015/0378002 A1* 12/2015 Hughes ................ G01S 5/0294
342/451

* cited by examiner

ARRANGEMENT FOR, AND METHOD OF, ENHANCING ACCURACY OF DATA COLLECTION FOR ITEMS LOCATED IN A VENUE

BACKGROUND OF THE INVENTION

The present disclosure relates generally to an arrangement for, and a method of, enhancing the accuracy of data collection for multiple items located in an indoor venue, such as a retail store, a factory, a warehouse, or a like indoor controlled area.

Radio frequency (RF) identification (RFID) reading technology and bar code reading technology are both employed for logistics concerns, material handling and inventory management in retail stores, factories, warehouses, distribution centers, buildings, and like indoor venues or controlled areas. A known RFID system includes a handheld RFID reader or mobile data capture device for interrogating at least one RFID tag, and preferably multiple RFID tags, in its coverage range. Each RFID tag is usually attached to, or associated with, an individual item, or to a package for the item, or to a pallet or container for multiple items. The RFID reader receives an RF signal from the tag(s) and decodes the signal into data. The decoded data, also known as a payload or information data, can denote a serial number, a price, a date, a destination, other attribute(s), or any combination of attributes, and so on, for the tagged item. A known bar code reading system includes a handheld reader or mobile data capture device, for example, either a moving laser beam-based reader or a solid-state imager-based reader, for electro-optically reading a bar code symbol that is associated with an item or a group of items. The symbol may be one-dimensional, such as a Universal Product Code (UPC) symbol, or a two-dimensional matrix code, such as a Quick Response (QR) code. The symbol may be printed on a label affixed to, or adjacent, the item(s). The bar code reader decodes return light from the symbol into information data, such as an item identifier, or a reference to a Uniform Resource Locator (URL), or any type of data related to the item.

In some applications, it is desirable to associate the information data captured by either of the above-described types of mobile devices with the location of the item in a venue. For example, when inventorying a population of items in a venue, a complete inventory should include not only the identity of each item, but also the location of each item in the venue. As another example, in an order fulfillment application, also known as voice-directed picking, workers or operators of the mobile devices are often paid by the rate at which an order for one or more items is filled, thereby sometimes leading some workers to rush and perhaps pick the wrong items. Knowing the location of a mobile device held and operated by a worker to capture data from each item and, in turn, the position of the worker in the venue is used to verify that the worker is in the correct position when a particular item is being picked. Such position verification can be used to train workers to not pick the wrong items and to improve the success of the picking task.

It is known to deploy a real-time locationing system in the venue to determine the location of the mobile device and, in turn, the location of the items in a reading or coverage zone in the vicinity of the mobile device. The locationing system may employ RF signals, or optical (usually infrared) signals, or acoustic (usually ultrasound) signals to locate the mobile device. For example, one or more ultrasonic emitters can be operated to determine the location of a mobile device that contains an ultrasonic receiver. Each ultrasonic emitter transmits ultrasonic energy, preferably in a short burst, which is received by an ultrasonic transducer (e.g., a microphone) in the ultrasonic receiver, thereby establishing the presence and the specific location of the mobile device within the venue, typically by using triangulation techniques known in the art.

Yet, the performance of the known locationing systems is sometimes less than ideal. RF, optical and acoustic locationing systems are all subject to multi-path reflections and scattering of their respective signals off various reflecting and/or absorbing surfaces, such as walls, curtains, windows, shelves, equipment, etc., in the venue, and sometimes their respective signals are weak, or even blocked by such surfaces. For example, optical and acoustic signals do not pass through walls. An RF system may also be subject to interference from stray RF signals. An optical system may also be subject to interference from ambient bright light. An acoustic system may also be subject to interference from ambient loud noise. Moreover, locationing performance may suffer when the mobile device is being moved quickly, for example, when held and operated by an operator running through the venue, rather than being held momentarily steady by the operator during data capture. During these less than ideal conditions, known locationing systems typically report an erroneous location, or perhaps the last known location, of the mobile device. Determining the locations of the items based on these erroneous locations of the mobile device results in erroneous item locations. Associating the erroneous item locations with the information data captured from the items results in an inaccurate inventory record.

Accordingly, it would be desirable to take such less than ideal performance by the locationing system into account, to alert an operator of the mobile device to take corrective action when the performance by the locationing system is below a reference threshold, and to prevent data capture when the performance by the locationing system is below a reference threshold, all with the goal of more accurately determining the locations of the items so that an accurate inventory record can be obtained.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
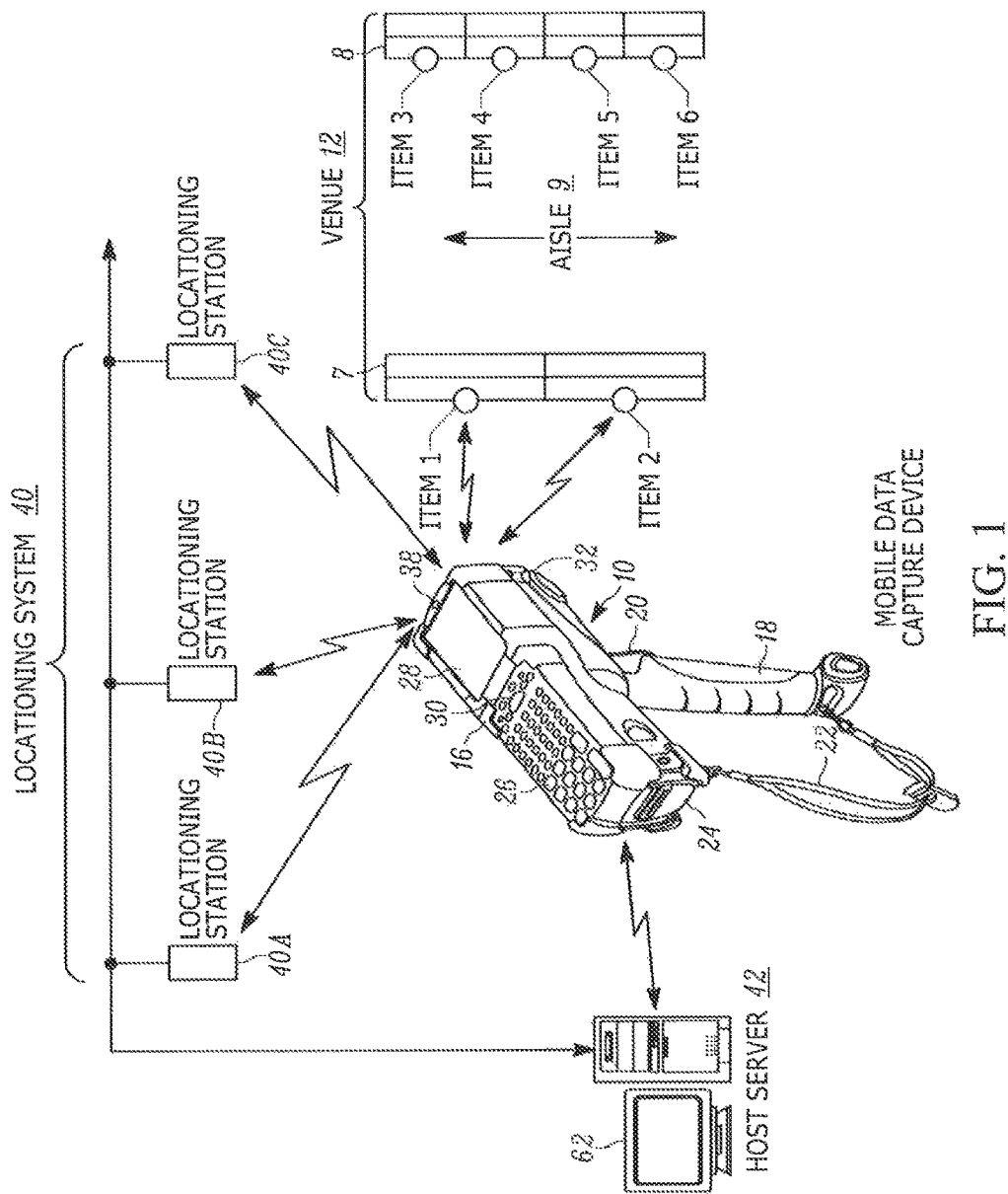
FIG. 1 is a part-perspective, part-pictorial view of an arrangement for enhancing the accuracy of data collection for items in a venue in accordance with the present disclosure.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The arrangement and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One aspect of this disclosure relates to an arrangement for enhancing the accuracy of data collection for items located in a venue. The arrangement includes a mobile data capture device, e.g., a radio frequency (RF) identification (RFID) tag reader or a bar code symbol reader, movable in the venue toward the items. The mobile device has a data capture module for capturing information data from each item in a reading state of operation. The arrangement also includes a real-time locationing system for determining device position data, e.g., device location and device location accuracy, of the mobile device in the venue at a variable level of locationing system performance. For example, the locationing system performance may vary as a function of ambient conditions in the venue that are less than ideal, e.g., stray RF interference, bright light, loud noise, multi-path reflections, weak signals, rapid movement of the mobile device, etc. A controller determines item position data, e.g., item location and item location accuracy, of each item in the venue based on the determined device position data of the mobile device. The controller also modifies the reading state of operation of the mobile device when the variable level is below a reference threshold level of locationing system performance.

For example, in one embodiment, the reading state may be modified by energizing a warning indicator when the variable level is below the reference threshold level to allow an operator of the mobile device to take corrective action. The corrective action may include simply waiting for better conditions, or manually entering the information data into the mobile device, or changing mobile device settings, or holding the mobile device steady, etc. In another embodiment, the reading state may be modified by interrupting the reading state of operation and preventing the capture of information data by the mobile device when the variable level is below the reference threshold level. In either embodiment, no erroneous device position data is obtained and, in turn, no erroneous item position data is determined and stored in an inventory record.

Another aspect of this disclosure is directed to a method of enhancing the accuracy of data collection for items located in a venue. The method is performed by moving a mobile data capture device in the venue toward the items, by capturing information data from each item in a reading state of operation of the mobile device, determining device position data of the mobile device in the venue at a variable level of locationing system performance, by determining item position data of each item in the venue based on the determined device position data of the mobile device, and by modifying the reading state of operation of the mobile device when the variable level is below a reference threshold level of locationing system performance.

Figure 2:
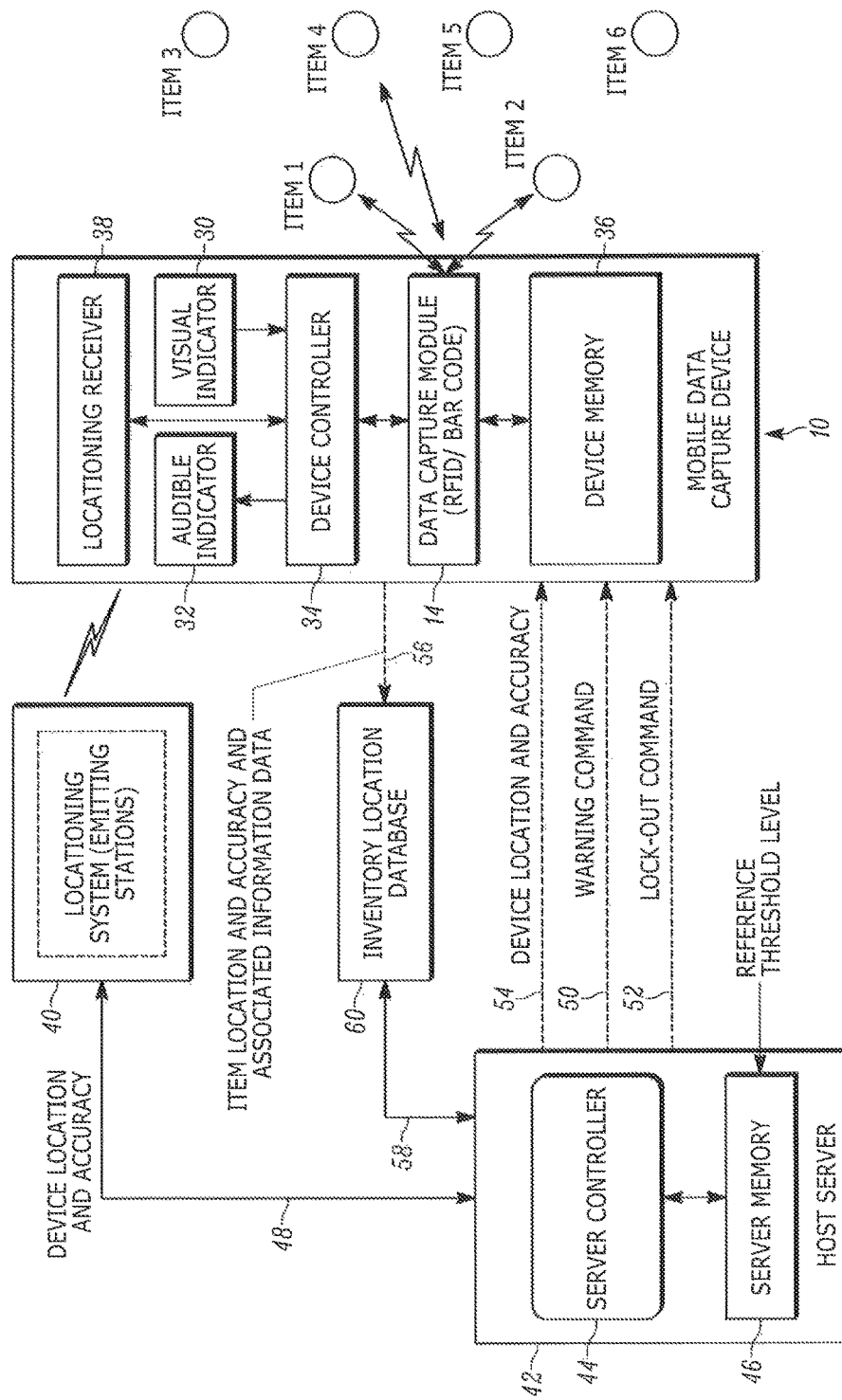
FIG. 2 is a diagrammatic view of the arrangement of FIG. 1.

Turning now to the drawings, reference numeral 10 in FIGS. 1-2 identifies a mobile data capture device 10 movable in a venue 12 toward multiple items 1-6 located in the venue. The mobile device 10 may be a radio frequency (RF) identification (RFID) tag reader, or a bar code symbol reader, or a like data capture device. The items 1-6 may have either RFID tags, or bar code symbols, or like targets having identification data, associated therewith. The mobile device 10 has a data capture module 14 (see FIG. 2) for capturing such information data from the tags/symbols/targets associated with the items 1-6 in a reading state of operation.

As best shown in FIG. 1, the mobile device 10 has a housing 16; a handle 18 adapted to be gripped and held by an operator for handheld operation; a trigger or actuator 20 on the handle 18 to initiate reading when manually depressed by the operator; an arm/wrist strap 22 to secure the housing 16 on the operator's arm from being dropped; a rechargeable DC battery 24 to electrically power the mobile device 10 for wireless mobile operation; a keyboard 26 with numeric, alphabetic and function keys for manual data/function entry; a display 28 for visually displaying data/prompts/device information to the operator; a visual indicator 30 (also see FIG. 2), such as a light emitting diode (LED), for emitting light when energized to notify the operator of the occurrence of a certain event, as described below; an audible indicator 32 (also see FIG. 2), such a speaker, or, as shown in FIG. 1, a headphone port to which a headphone is connected, for emitting sound when energized to notify the operator of the occurrence of a certain event, as described below; and a microphone 38 for listening to the operator's verbal commands, and, as shown in FIG. 2, also serving as a locationing receiver, as described below. As best shown in FIG. 2, the mobile device 10 also has a programmed microprocessor or device controller 34 that controls all the electrical components in the mobile device 10, and a device memory 36 for storing data under the control of the device controller 34.

The items 1-6 may be positioned anywhere in the venue 12 and, as shown in FIG. 1, are mounted on shelving units 7, 8 separated by an aisle 9. The items may be placed at the same height and at a uniform spacing, or can be placed at various elevations and at different spacings. It will be understood that many more than the two or the four items illustrated in FIG. 1 may be stored on the shelving units 7, 8, and also that many more than the one aisle 9 illustrated in FIG. 1 may be present in a particular venue 12. Indeed, some venues have many thousands of items and many hundreds of aisles.

When the mobile device 10 is an RFID tag reader, the data capture module 14 interrogates at least one RFID tag, and preferably multiple RFID tags, in its coverage range or reading zone. Each RFID tag is usually attached to, or associated with, an individual item, or to a package for the item, or to a pallet or container for multiple items. The data capture module 14 receives an RF signal from the tag(s) and decodes the signal into data. The decoded data, also known as a payload or information data, can denote a serial number, a price, a date, a destination, other attribute(s), or any combination of attributes, and so on, for the tagged item. When the mobile device 10 is a bar code symbol reader, the data capture module 14 receives and decodes return light from the symbol into information data, such as an item identifier, or a reference to a Uniform Resource Locator (URL), or any type of data related to the item. In the case of a moving laser beam-based reader, the return light is laser light reflected and scattered from the symbol. In the case of a solid-state imager-based reader, the return light is light forming an image of the symbol. The symbol may be one-dimensional, such as a Universal Product Code (UPC) symbol, or a two-dimensional matrix code, such as a Quick Response (QR) code. The symbol may be printed on a label affixed to, or adjacent, the item(s).

As described above, it is desirable to associate the information data captured by the mobile device 10 (either the RFID tag reader or the symbol reader) with the locations or positions of the items 1-6 in the venue 12. A complete inventory should include not only the identity of each item 1-6, but also the location or position of each item 1-6 in the venue 12. To that end, a real-time locationing system 40 is provided in the venue 12 to determine the location or position of the mobile device 10 and, in turn, the location or position of the items 1-6 in the reading or coverage zone in the vicinity of the mobile device 10. The locationing system 40 may employ RF signals, or optical (usually infrared) signals, or acoustic (usually ultrasound) signals to locate the mobile device 10. For example, as shown in FIG. 1, a plurality of locationing stations 40A, 40B, 40C, or ultrasonic emitting stations, is operated to determine the location or position of the mobile device 10 that contains an ultrasonic locationing receiver, e.g., the microphone 38. Each ultrasonic locationing station 40A, 40B, 40C transmits ultrasonic energy, preferably in a short burst, which is received by the ultrasonic locationing receiver (microphone 38), thereby establishing the presence and the specific location or position of the mobile device 10 within the venue 12, typically by using triangulation techniques known in the art. Although only three locationing stations 40A, 40B, 40C have been illustrated in FIG. 1, it will be understood that many more than three could be provided in a particular venue 12.

A host server 42 is operatively connected over wired and/or wireless connections to the locationing system 40 and the mobile device 10. The host server 42 has a programmed microprocessor or server controller 44 that controls the locationing system 40 and the mobile device 10, and a server memory 46 for storing data under the control of the server controller 44. The server controller 44 and/or the device controller 34 determine the location or position of each item 1-6 in the venue 12 based on the determined location or position data of the mobile device 10.

As described above, the performance of locationing systems in general, as well as the acoustic locationing system 40 in particular, is sometimes less than ideal. The acoustic locationing system 40, like the other locationing systems, is subject to multi-path reflections and scattering of their respective signals (e.g., echoes) off various reflecting and/or absorbing surfaces, such as walls, curtains, windows, shelves, equipment, etc., in the venue 12, and sometimes their respective signals (e.g., echoes) are weak, or even blocked (or absorbed) by such surfaces. The acoustic locationing system is also subject to interference from ambient loud noise, and its locationing performance may suffer when the mobile device 10 is being moved quickly, for example, when held and operated by the operator running through the venue 12, rather than being held momentarily steady by the operator during data capture. During these less than ideal conditions, the known locationing systems typically report an erroneous location, or perhaps the last known location, of the mobile device 10. Determining the locations of the items 1-6 based on these erroneous locations of the mobile device 10 results in erroneous item locations. Associating the erroneous item locations with the information data captured from the items 1-6 results in an inaccurate inventory record. This disclosure is concerned with enhancing the accuracy of the inventory record by taking the less than ideal conditions into account to obtain a more accurate device location and, in turn, more accurate item locations.

In accordance with this disclosure, the server controller 44 and/or the device controller 34, hereinafter sometimes just called the controller, modifies the reading state of operation of the mobile device 10 when its locationing system performance, which varies, for example, due to the above-described variable ambient conditions in the venue, is below a reference threshold level.

For example, in one embodiment, the reading state may be modified by having the controller 34, 44 energize a warning indicator, e.g., the visual indicator 30 and/or the audible indicator 32, when the variable level is below the reference threshold level to allow the operator of the mobile device 10 to take corrective action. The corrective action may include simply waiting for better conditions, or manually entering the information data into the mobile device 10 via the keyboard 26, or changing the mobile device settings via the keyboard 26, or holding the mobile device 10 steady, etc. In another embodiment, the reading state may be modified by having the controller 34, 44 interrupt or lock-out the reading state of operation and prevent the capture of information data by the mobile device 10 when the variable level is below the reference threshold level. In either embodiment, the reading state is initiated, typically by actuating the trigger 20, but could also be actuated by voice via the microphone 38, or by actuating one of the function keys on the keyboard 26, or even automatically. In either embodiment, the accuracy of device position data is improved and, in turn, the accuracy of item position data is improved and stored in an inventory record.

More particularly, as best shown in FIG. 2, during its operation, the locationing system 40 determines a device location and a device location accuracy (together known as device position data), and sends this device position data to the host server 42 via connection 48. Accuracy, also known as a confidence level, is the degree or extent to which a measurement is correct. For example, the locationing system 40 may determine that a measurement of the device location is anywhere from about one to about five feet, and that its accuracy or confidence level is anywhere from between 0% to 100%.

If the ideal level of the locationing system performance is 100%, then a reference threshold level of the locationing system performance, say, for example, 50%, is stored in the server memory 46. The server controller 44 processes the received device position data to obtain the real-time level of performance, and then compares the real-time level with the stored reference threshold level. When the real-time level is less than the stored reference threshold level, then the server controller 44 modifies the reading state of operation of the mobile device 10 by issuing either a warning command via connection 50 to the mobile device 10 to instruct the device controller 34 to energize the visual indicator 30 and/or the audible indicator 32 to warn the operator to take corrective action as described above, or a lock-out command via connection 52 to the mobile device 10 to instruct the device controller 34 to lock-out the reading state of operation and prevent the capture of information data by the mobile device 10.

The received device position data is sent via connection 54 to the mobile device 10 so that the device controller 34 can determine an item location and an item location accuracy (together known as item position data), and sends this item position data to the device controller 34. The device controller 34 associates the item position data with the information data captured by the data capture module 14, and sends the associated information data and the associated item position data to an inventory database 60 for storage therein via a connection 56. The database 60 is connected to the host server 42 via a connection 58 so that the host server 42 can process the stored information data and the item position data, and/or display the stored data on a display 62.

In a variation, the reference threshold level could be stored in the device memory 36, and the warning and lock-out commands could be generated onboard the mobile device 10. In addition to, or instead of, the visual and audible indicators 30, 40, a vibrator or haptic engine could be mounted on the mobile device 10, particularly in the handle 18 or the trigger 20, to warn the operator to take corrective action when the real-time performance level is less than the stored reference threshold level of performance. Furthermore, the device controller 34 may optionally be configured to selectively override the energization of the warning indicators 30, 32 and the prevention of the capture of information data by the data capture module 14. For example, an override prompt may appear on the display 28 for selection by the operator.

Figure 3:
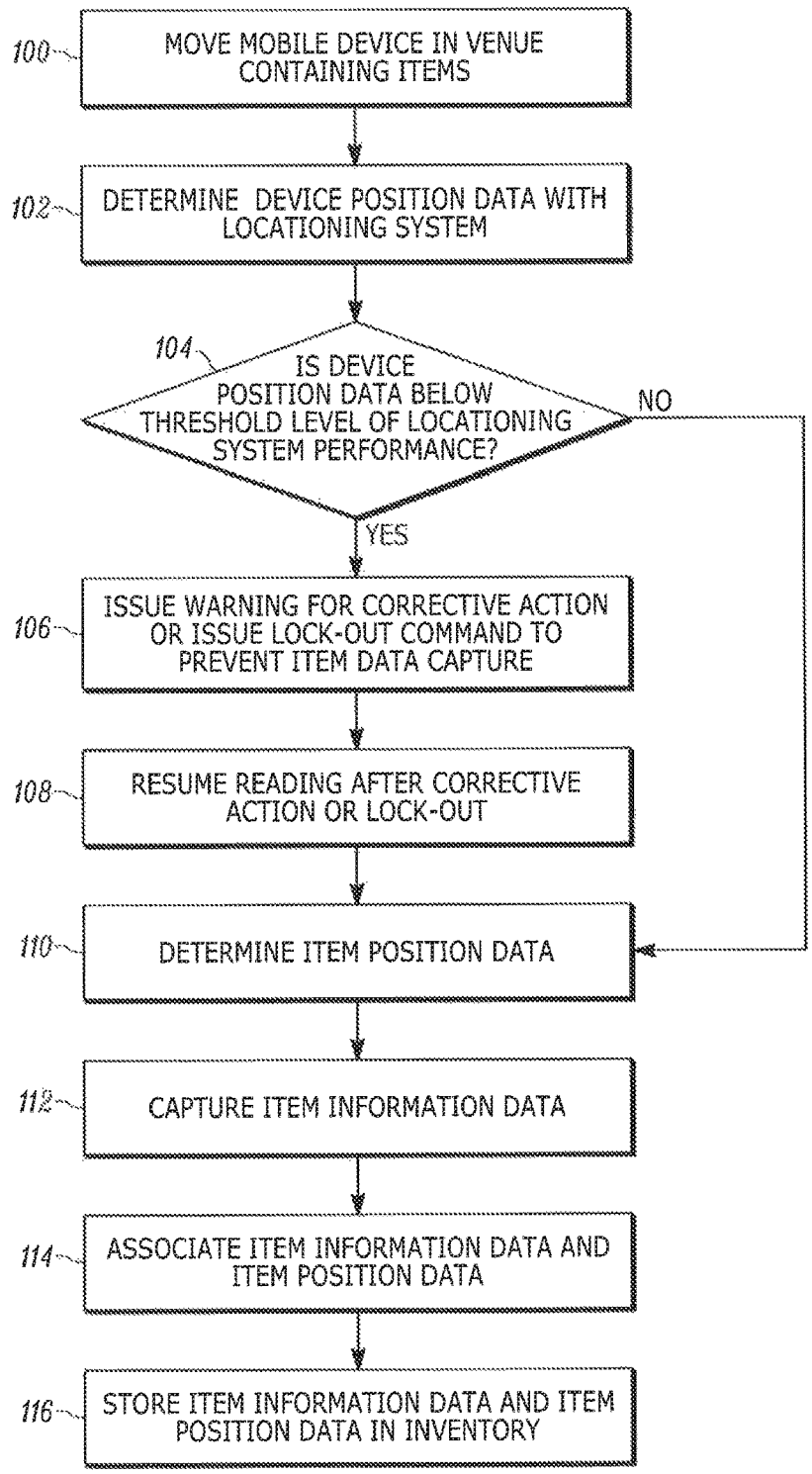
FIG. 3 is a flow chart depicting steps performed in accordance with the method of the present disclosure.

The disclosed method is performed, as shown in the flow chart of FIG. 3, by moving the mobile device 10 in the venue 12 toward the items 1-6 in step 100, and by determining device position data of the mobile device 10 in the venue with the locationing system 40 operating at a variable level of locationing system performance in step 102. Then, in step 104, the real-time level of locationing system performance is compared to the stored reference threshold level. If the real-time level is below the threshold level, then warning or lock-out commands are generated in step 106. Once corrective action has been taken, or the lock-out is no longer needed, then the reading state is resumed in step 108. The item position data is determined in step 110. The item information data is captured in step 112. The item information data and the item position data are associated in step 114. The associated item information data and the item position data are then stored in the inventory database 60 in step 116. If the real-time level is above the threshold level, then steps 106, 108 are not performed.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. An arrangement for enhancing accuracy of data collection for items located in a venue, the arrangement comprising:
a mobile data capture device movable in the venue toward the items, and having a data capture module for capturing information data from each item in a reading state of operation;
a real-time locationing system for determining device position data of the mobile data capture device in the venue at a variable level of a device location accuracy; and
a controller for determining item position data of each item in the venue based on the determined device position data of the mobile data capture device, and for modifying the reading state of operation of the mobile data capture device when the variable level is below a reference threshold level of the device location accuracy,
wherein the real-time locationing system includes a plurality of locationing stations that are spaced apart of one another in the venue, and that are together operative for determining the device position data of the mobile data capture device at the variable level of the device location accuracy which varies as a function of ambient conditions in the venue.

2. The arrangement of claim 1, and further comprising a radio frequency (RF) identification (RFID) tag having a payload constituting the information data associated with each item, and wherein the data capture module includes an RFID tag reading assembly for reading the payload of each tag.

3. The arrangement of claim 1, and further comprising a bar code symbol constituting the information data associated with each item, and wherein the data capture module includes a bar code reading assembly for electro-optically reading the symbol.

4. The arrangement of claim 1, wherein the mobile data capture device includes a handheld housing, and an actuator for manually actuating the reading state of operation.

5. The arrangement of claim 1, and further comprising a host server for controlling the mobile data capture device and the locationing system, and wherein the controller is mounted in at least one of the host server and the mobile data capture device.

6. The arrangement of claim 1, and further comprising an energizable warning indicator supported by the mobile data capture device, and wherein the controller is configured to energize the warning indicator when the variable level is below the reference threshold level to allow corrective action to be taken.

7. The arrangement of claim 1, wherein the controller is configured to interrupt the reading state of operation and to prevent the capture of information data by the data capture module when the variable level is below the reference threshold level, and to resume the reading state of operation and to permit the capture of information data by the data capture module after the reference threshold level has been met.

8. The arrangement of claim 1, and further comprising an energizable warning indicator energized by the controller when the variable level is below the reference threshold level; wherein the controller is configured to prevent the capture of information data by the data capture module when the variable level is below the reference threshold level; and wherein the controller is configured to selectively override at least one of energization of the warning indicator and prevention of the capture of information data.

9. The arrangement of claim 1, wherein the locationing system determines both a device location and the device location accuracy to constitute the device position data; wherein the controller determines both an item location and an item location accuracy to constitute the item position data; and further comprising an inventory database; and wherein the controller associates the information data with the determined item location and the determined item location accuracy, and stores the associated information data with the associated item location and the associated item location accuracy in the inventory database.

10. A method of enhancing accuracy of data collection for items located in a venue, the method comprising:
moving a mobile data capture device in the venue toward the items;
capturing information data from each item in a reading state of operation of the mobile data capture device;
determining, during time periods of variable ambient conditions in the venue, device position data of the mobile data capture device in the venue at a variable level of the device location accuracy;
determining item position data of each item in the venue based on the determined device position data of the mobile data capture device; and
modifying the reading state of operation of the mobile data capture device when the variable level is below a reference threshold level of the device location accuracy,
wherein the operation of determining device position data of the mobile data capture device is done via a real-time locationing system that includes a plurality of locationing stations that are spaced apart from one another in the venue, and that are together operative for determining the device position data of the mobile data capture device at the variable level of the device location accuracy which varies as a function of ambient conditions in the venue.

11. The method of claim 10, and associating a radio frequency (RF) identification (RFID) tag having a payload with each item, and wherein the capturing of the information data is performed by reading the payload of each tag.

12. The method of claim 10, and associating a bar code symbol with each item, and wherein the capturing of the information data is performed by electro-optically reading the symbol.

13. The method of claim 10, and manually actuating the reading state of operation.

14. The method of claim 10, and controlling the mobile data capture device and the locationing system with a host server.

15. The method of claim 10, and energizing a warning indicator when the variable level is below the reference threshold level, and taking corrective action.

16. The method of claim 10, and interrupting the reading state of operation and preventing the capture of information data when the variable level is below the reference threshold level, and resuming the reading state of operation and permitting the capture of information data after the reference threshold level has been met.

17. The method of claim 10, and energizing a warning indicator when the variable level is below the reference threshold level, and preventing the capture of information data when the variable level is below the reference threshold level, and selectively overriding at least one of the energizing of the warning indicator and the preventing of the capture of information data.

18. The method of claim 10, wherein the determining of the device position data is performed by determining both a device location and the device location accuracy; wherein the determining of the item position data is performed by determining both an item location and an item location accuracy; and associating the information data with the determined item location and the determined item location accuracy; and storing the associated information data with the associated item location and the associated item location accuracy in an inventory database.

* * * * *